US012670789B2

(12) United States Patent
 Bouttier

(10) Patent No.: US 12,670,789 B2
(45) Date of Patent: Jun. 30, 2026

(54) METHOD FOR MANAGING TRAFFIC OF CONNECTED AND AUTOMATED VEHICLE

(71) Applicant: MITSUBISHI ELECTRIC CORPORATION, Tokyo (JP)

(72) Inventor: Arnaud Bouttier, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 248 days.

(21) Appl. No.: 18/570,540

(22) PCT Filed: Jan. 20, 2022

(86) PCT No.: PCT/JP2022/002973
 § 371 (c)(1),
 (2) Date: Dec. 14, 2023

(87) PCT Pub. No.: WO2023/032249
 PCT Pub. Date: Mar. 9, 2023

(65) Prior Publication Data
 US 2024/0274006 A1    Aug. 15, 2024

(30) Foreign Application Priority Data
 Aug. 30, 2021    (EP) ..................................... 21306165

(51) Int. Cl.
 G08G 1/00       (2006.01)
 G08G 1/0967    (2006.01)
 B60W 30/18     (2012.01)
(52) U.S. Cl.
 CPC ..... G08G 1/0967 (2013.01); B60W 30/18159 (2020.02); B60W 2520/10 (2013.01);
 (Continued)

(58) Field of Classification Search
 CPC .. G08G 1/0967; G08G 1/0112; G08G 1/0133; G08G 1/08; G08G 1/093;
 (Continued)

(56) References Cited

U.S. PATENT DOCUMENTS

2017/0205825 A1* 7/2017 Wang ................... G05D 1/0088
2019/0244578 A1* 8/2019 Wu ........................ G06F 3/0416
2020/0394911 A1* 12/2020 Harmel ................ G05D 1/0287

FOREIGN PATENT DOCUMENTS

GB        2557426 A    6/2018
WO    WO 2019/172944 A1    9/2019

OTHER PUBLICATIONS

International Search Report for PCT/JP2022/002973 (PCT/ISA/210) mailed on Jun. 10, 2022.

(Continued)

*Primary Examiner* — Shardul D Patel

(74) *Attorney, Agent, or Firm* — Birch, Stewart, Kolasch & Birch, LLP

(57)    ABSTRACT

A method for managing traffic of connected and automated vehicles, CAV, at a road intersection with N branches is provided. The method includes, for each branch i of M branches among the N branches, with i∈[1;M], M equal or greater than 2 and smaller or equal to N: obtaining by a CAV data related to vehicles in the i-th branch, determining by said CAV a i-th value relative to a level of priority of the i-th branch, comparing the i-th values, and according to the result of the comparison, instructing a first CAV in one p-th branch among the M branches to enter a crossing area, CA, of the road intersection at an entering time.

19 Claims, 4 Drawing Sheets

(52) U.S. Cl.
CPC ..... *B60W 2556/45* (2020.02); *B60W 2720/10* (2013.01); *B60W 2720/106* (2013.01)

(58) Field of Classification Search
CPC ........... G08G 1/0965; G08G 1/096725; G08G 1/096791; G08G 1/162; G08G 1/0145; G08G 1/00; B60W 30/18159; B60W 2520/10; B60W 2556/45; B60W 2720/10; B60W 2720/106
USPC .......................................................... 701/24
See application file for complete search history.

(56) References Cited

OTHER PUBLICATIONS

Written Opinion of the International Searching Authority for PCT/JP2022/002973 (PCT/ISA/237) mailed on Jun. 10, 2022.

\* cited by examiner

METHOD FOR MANAGING TRAFFIC OF CONNECTED AND AUTOMATED VEHICLE

TECHNICAL FIELD

The present invention relates to Connected and Automated Vehicles (CAVs) also named vehicles in the following. It relates more precisely to the management or assistance of crossing intersections by the Connected and Automated Vehicles.

BACKGROUND ART

Some methods rely on the traffic lights to manage the crossing of Connected and Automated Vehicles at crossing intersections. Those technics use on-board cameras to detect the traffic lights. However, those technics cannot be implemented for crossing intersections with no traffic lights, for example when crossing is performed with the priority rules or simply with a stop sign.

Some other methods require the deployment of specific equipment (for example, communication and computing units) at the crossing intersections to control the crossing of the Connected and Automated Vehicles. The deployment of such equipment is costly and time consuming.

SUMMARY OF INVENTION

Therefore, there is a need of a method to enable the management of crossing intersections by the Connected and Automated Vehicles (CAV) that does not require any specific infrastructure.

In addition, such method should not require a high amount of computation to be performed in real time by any on board processor even in complex crossing situations.

The present invention aims at improving the situation.

To this end, the invention relates to a method for managing traffic of Connected and Automated Vehicles at a road intersection comprising N branches, said method comprising:

for each branch i of M branches among the N branches, with i∈[1;M], M equal or greater than 2 and smaller or equal to N:

receiving by a CAV in the i-th branch data related to other vehicles in the i-th branch;

determining by said CAV a i-th value relative to a level of priority of the i-th branch based on data related to said CAV, and said data related to the other vehicles in the i-th branch;

comparing the i-th values;

according to the result of the comparison, instructing a first CAV in one p-th branch among the M branches to enter a crossing area, CA, of the road intersection at a entering time.

Therefore, a CAV at the crossing intersection obtains (for example receives) data from the other vehicles of the i-th branch and computes a level of priority. This level of priority is computed without requiring the data from the vehicles of other branches. Therefore, each value relative to a level of priority of one of the branch can be computed independently from the others. Thus, this enables to enhance strongly the flexibility of the computing, for instance the computing of the levels can be dispatch throughout different CAVs at the crossing intersection. For example, in each branch of the crossing intersection a CAV can perform the determination of the level of priority of the branch in which this CAV is, thus reducing the amount of data transmission required to implement the method, indeed, the data related to vehicles in a branch are only transmitted to CAVs in that branch. In addition, dispatching the computing enables to reduce the time required to perform the computing of all the levels, since several processors are mutualized or involved.

Therefore, the methods may be implemented such as for at least two branches i and j among the M branches of the N branches, with i,j∈[1;M]², M equal or greater than 2 and smaller or equal to N:

obtaining by a CAV in the i-th branch data related to vehicles in the i-th branch and determining by said CAV in the i-th branch a i-th value relative to a level of priority of the i-th branch;

obtaining by a CAV in the j-th branch data related to vehicles in the j-th branch and determining by said CAV in the j-th branch a j-th value relative to a level of priority of the j-th branch.

In that case, the CAV performing the determination of the i-th value is different from the CAV determining the j-th value.

The CAV performing the determination of the value may as well be in another branch than the branch of the vehicles from which it receives the data related to vehicles. However, the CAV performing the determination of the i-th value may be different from the CAV determining the j-th value.

When the determination of the levels is performed, these levels are compared together. For example, the comparison can be performed by one of the CAV at the crossing intersection, for example, one of the CAV that performed the determination of one or several of the levels may receive the levels that this CAV did not compute to perform the comparison. This comparison may in addition be performed by several CAVs, for example, each CAV which determined a level of priority may compare it to the other levels (which are sent to it). The levels of priority represent a very small quantity of data compared to the data related to the vehicles, therefore, the transmission of these levels of priority instead of transmitting the data related to the vehicles at a greater scale enables to reduce the requirement in terms of network capacity and stability. The comparison may be performed in each of the M branch by the first CAV of that branch, in that case, no transmission is required to instruct the relevant first CAV to enter the crossing area. In addition, these first CAVs may also determine the level of priority of their own branch, each of the first CAVs sending the value of level of priority to the other first CAVs. Other methods of sending the values may be used for example each first CAVs may send back only the highest value among the values he received and/or determined.

Therefore, the method enables to reduce the load of data transmission required to perform an efficient management of the CAVs at a crossing intersection. Moreover, the method enables a great flexibility on which CAVs will be involved to perform each task of the method. As previously indicated the first CAV of each branch can be selected to receive the data related to the vehicles in its branch and to compute the value of level of priority (of its branch). The first CAVs of the M branches can transmit the values to enable each of the first CAVs to perform part or all of the comparison. The CAVs which performed the determination of the values may also be chosen for their computing capacity or for the quality of their transmission link with other CAVs at the crossing intersection.

By Connected and Automated Vehicles it is understood vehicles which steer, accelerate, and brake with little to no human input. These actions performed by the vehicles are done at least based on data obtained by communicating through a network, for example directly with another vehicle (V2V communication), with any access point (Base station), or with any other entity through V2X communication (for example, communicating with a unit near the road). Some vehicles in the crossing intersection may not be CAVs, in that case these classical vehicles will not perform the determination of the values and the comparing of these values. However, the data related to these vehicles will also be sent to the CAVs for processing. These data may be obtained through the CAVs. For example, based on sensors and cameras of the CAVs data related to none CAV vehicles may be obtained. The classical vehicles may also have sensors and cameras to assist the driver or to automat simple actions for instance following a CAV.

By managing traffic of CAVs it is understood to instruct these CAVs to perform actions to be taken at a crossing intersection or at least to enable them to determine instructions enabling to take a decision at the crossing intersection in accordance with the other vehicles at the crossing intersection.

These actions are, for example, slowing down and stopping at a specific position, maintaining a specific speed, entering the crossing area at a specific speed, to stay still, etc.

By road intersection or crossing intersection it is understood a junction or intersection of three or more branches at the same level, that is, an at-grade junction. Such intersection may comprise a traffic-control device such as a stop sign or traffic light. In the following the road intersection comprises at least three branches and a crossing area.

By branches it is understood the transport axes or road segments or at least part of these transport axes or road segments (that is, at least the part near the center of the road intersection) which joins at the crossing intersection. Therefore, a branch is a part of a transport axe or road segment that extends from:

a specific distance from a reference point of the crossing intersection or from the line the cars should not cross if they do not immediately enter the crossing area (named stopping line in the following), these stopping lines usually correspond to the lines related to the traffic lights or the stop signs, to the stopping line of the branch.

The branches can be of equal length (same specific distance for all the branches) or not. The specific distance may be determined according to the maximum distance required for enabling communication between two CAVs in the branch (for example, the specific distance can be set as this maximum distance).

By reference point of the crossing intersection it is understood a geographic point known by all the CAVs entering the crossing intersection or at least by the CAVs which determine the values and/or the first CAV of each branch. The reference point of the crossing intersection may be a point identified as the center of the crossing intersection.

The branch may be limited to the part of the transport axe or road segment corresponding to the lane heading towards the crossing area. Each lane heading towards the crossing area of a multi-lane road (with several lanes heading towards the crossing area) may be considered as a branch.

By crossing area it is understood the area of the crossing intersection which is delimited by the stopping lines of all the branches. This crossing area is the area through which the vehicles pass to go from a branch to another.

By receiving by a CAV data it is understood that the data is received via the communicating capacity of the CAV.

By obtaining by a CAV the data related to vehicles in the branch it is understood either to receive these data and/or to determine these data. For example, a CAV will determine the data related to itself. A CAV may also determine the data related to vehicle near it, especially vehicles that are not CAVs.

By value related to a level of priority of a branch it is understood a value enabling to determine, when compared with a value of another branch, the branch where the first CAV should enter the crossing area if no other branch is considered. Put in another way, if the level of priority of one branch is lower than the level of priority of at least one other branch, the first CAV of that one branch will not enter the crossing area at the entering time. In contrary, if the level of priority of one branch is higher than the levels of priority of all the other branches, the first CAV of that one branch will enter the crossing area at the entering time.

The M branches may be branches for which at least one CAV is present in each of these branches. Other vehicles (non CAV) may also be present. The branches among the N branches other than the M branches may have no CAV, for example, no vehicles are present in those branches at the moment the method is performed or at least no CAV which is in position to enter the crossing area at the entering time.

By entering time it is understood a time at which one of the first CAV of one of the M branches is instructed to enter the crossing area.

By entering the crossing area it is understood that a reference point on the vehicle enters the crossing area, this reference point on the vehicle may be at any place on the vehicle for example at the front of the vehicle or at the back of the vehicle or at the middle of the vehicle. In an equivalent way, by a vehicle at a position it is understood that the reference point on the vehicle is at this same position.

By first CAV of a branch it is understood the CAV, among the CAVs of that branch going in the direction of the crossing area, which is positioned first in that branch regarding the proximity to the stopping line of that branch.

By data related to vehicles in a branch it is understood any data relevant to determine the level of priority of that branch, and more specifically data related to waiting times of the vehicles of that branch, thus this data may be related to the positions of these vehicles (for example, positions of the vehicles at several moments), the speeds of these vehicles (for example, speeds of the vehicles at several moments), the time spent by each vehicle at standstill in the branch, the time spent by each vehicle in the branch, etc.

M may be strictly greater than 2. The value of a branch in which no CAVs is present may be considered as of the lower level of priority.

According to an aspect of the invention, the first CAV in the p-th branch is instructed to enter and cross the CA at a target speed.

Therefore, the first CAV which is instructed to enter the crossing area, receives instruction to enter the CA at a specific speed or is enabled (for example, via parameterization of the CAV) to determine these instructions.

This enables to simplify the management of the crossing intersection. Indeed, by setting a target speed it enables to predict with less computing the progress of the CAV in the CA and/or the moment when the first CAV will leave the CA. This enables to determine easily when should a next CAV enter the CA.

In addition, setting a target speed to enter the CA (target speed which may be the same for each CAV entering the CA) enables to simplify the management of the first CAV before its entry in the CA. Indeed, having a target speed to which the CAV should enter the CA at the entering time reduces the complexity of the determination of the actions (accelerating, maintaining the speed) to be performed by the first CAV to effectively enter the CA at the entering time. For example, if the CAV is standing still, it is less complex to determine the acceleration required to enter the CA at the entering time and at the target speed. These instructions may further instruct to cross the CA at this target speed. Therefore, the prediction of the position of the first CAV is less complex.

The target speed may be determined such as the time required to perform the actions by the first CAV to effectively enter the CA at the entering time from its position lasts for a time unit. A time unit is understood as the elementary duration on the basis of which the timeline is partitioned and used as a reference to predict and perform the actions by the CAVs.

According to an aspect of the invention, the invention comprises selecting the M branches among the N branches such as in each i-th branch of the M branches, the first CAV of the i-th branch is at a distance from the CA (that is at a distance from the stopping line) and at a speed such as in one time unit the first CAV can enter the CA at the entering time.

The levels of priority of the branches in which the first CAV cannot enter the CA at the entering time are not computed. This reduces the computing required. The first CAVs of these branches are too far from the stopping line to enable entering the CA at the entering time.

On the other hand, all the first CAVs of these M branches are candidates to enter the CA at the entering time. Therefore, the level of priority of these M branches is computed to determine which one of these first CAVs is to enter the CA. The first CAVs of each branch may be instructed to be at the distance from the CA (that is at the distance from the stopping lines) and speed before the beginning of a time unit. The first CAVs which will arrive at these positions and speed before the last time unit previously to the entering time (the entering time being the moment at the end of this time unit), are considered to compete for the occupation of the CA starting from the entering time. The first CAVs of the other branches among the N branches are behind such positions and therefore are not in position enabling to enter the CA at the entering time, however, these first CAVs will arrive at these positions and speed at the beginning of time units after the entering time. The speed at which the CAV arrive may be equal or below the target speed.

By distance from the CA it is understood the distance between the stopping line and the vehicle.

According to an aspect of the invention, for each i-th branch of the M branches, the first CAV of the i-th branch is either:

at a first position in the i-th branch and at a target speed, or at a second position in the i-th branch and at a speed of 0.

In both, the first position and the second position, the first CAVs are respectively at distances from the CA and at speeds such as in one time unit they can enter the CA at the entering time. Therefore, it enables:

first CAVs to be at standby before entering the CA if their branches are not considered priority, enabling to wait a next entering time before being instructed to enter the CA, while a first CAV to enter the CA without requiring previously to stop at the second position.

Instructions may be sent to the first CAVs (or the first CAVs may be parametrized to determine those instructions)

to instruct them to be at the first position or second position at a beginning of a time unit.

The distance from the stopping line to the first position may be twice the distance from the stopping line to the second position.

According to an aspect of the invention, the invention further comprises for at least one q-th branch among the M branches other than the p-th branch:

instructing a first CAV in the q-th branch to slow down and stop at the second position within a time unit, if the first CAV in the q-th branch is at the first position; or instructing the first CAVs in the q-th to standstill during at least a time unit at the second position, if the first CAV in the q-th branch is at the second position.

Therefore, the CAVs in the first position that are not instructed to enter the CA can stop at the second position in one time unit and therefore be candidates for competing for entering the CA in a next entering time. Therefore, at the first position the CAVs can compete with the CAVs at the second position for entering in the CA at the entering time, the ones that are not considered priority may therefore stop at the second position. Therefore, the first CAVs do not necessarily need to stop to enter the CA, which is especially advantageous when the traffic is not dense. This is made possible since, for the first CAVs at the first position, the time required to enter the CA and the time required to stop at the second position is the same, that is, one time unit; and since, the time required to enter the CA from the second position is also of one time unit. This enables to reduce the complexity and the diversity of the states in which the first CAVs can and/or will be and therefore reduces the computation required to instruct each first CAV.

The first position, the second position and the target speed may differ from a branch to another or from a first CAV to another, as long as the distance from the stopping line and the speed enables them to enter in one time unit in the CA or stop in one time unit at a distance also enabling them to enter in one time unit the CA.

According to an aspect of the invention, instructing the first CAV in the q-th branch to standstill at the second position during at least a time unit is an instruction to standstill at the second position during at least L−1 time units after the entering time, where L time units corresponds to a time duration for crossing the CA at the target speed.

Therefore, the CA is allocated to the first CAV of the p-th branch for at least the time required for this first CAV of the p-th branch to cross the CA. This reduces the complexity and the periodicity of the computation. Indeed, the next entering time (after the entering time at which the first CAV of the p-th branch entered the CA) will be at least after L time unit after the entering time and there is no need to consider the position of the first CAV of the p-th in the CA.

According to an aspect of the invention, the invention further comprises instructing the first CAV in the p-th branch to:

accelerate within one time unit to the target speed to enter the CA at the entering time, if the first CAV in the p-th branch is at the second position; or maintain the target speed to enter the CA at the entering time, if the first CAV in the p-th branch is at the first position.

As previously indicated the first position and the second position both enable to enter the CA in one time unit, therefore simplifying the computing (reducing the states of the system and the complexity of them).

According to an aspect of the invention, the first position and the second position are determined based on predefined speed curves and/or acceleration curves for accelerating from the second position to enter the CA in one time unit and for slowing down from the first position to stop at the second position in one time unit.

In addition, the time unit used to partition the timeline may also be adapted to enable to perform the acceleration and slowing down can be performed safely.

The speed curve and/or acceleration may be determined based on speed curves and/or acceleration curves that are possible for the vehicles that use the crossing intersection, that is, these speed curves and/or acceleration curves take into account the vehicles' power for example taking into account the average power of low power vehicles. In addition, these speed curves and/or acceleration curves may take into account such as accelerating from the second position to enter the CA and slowing down from the first position to stop at the second position can be performed safely or/and comfortably for the passengers of the CAVs.

According to an aspect of the invention, the invention further comprises instructing a second CAV in the p-th branch to enter the CA following the first CAV in the p-th branch entering the CA.

This enables to increase the number of vehicles crossing the crossing intersection. Indeed, the use of the CA is optimized since two or more vehicles enter the CA without significantly increasing the occupancy time of the CA (that is, the time during which a first CAV from a different branch than the p-th branch can enter the CA).

By entering the CA following the first CAV it is understood to follow the first CAV, for example, at a particular distance, through the CA (the first CAV and the second CAV are then considered as packed).

According to an aspect of the invention, for at least a i-th branch among the M branches the CAV obtaining the data related to vehicles and determining the level of priority of the i-th branch is the first CAV of the i-th branch.

This reduces the quantity of data to be exchanged to perform the method. Indeed, each of the first CAV of each branch may obtain the data related to vehicles of its branch and compute the level of priority of its branch. The first CAV of the i-th branch is the closest CAV in the i-th branch to the CAVs in the other branches and especially to the other first CAVs. Therefore, communication between CAVs of different branches is easier between the two first CAVs of these branches, thus, the number of CAVs that need to be involved (in two-to-two V2V communications, that is, communicating directly between two CAVs without using a third CAV) to transmit data between two CAVs of two different branches is therefore reduced, thus reducing the network congestion. Advantageously, the one or several CAVs performing the comparison can be the first CAVs, therefore, only requiring receiving the other values but not the value they computed. Finally, the first CAV or the plurality of first CAVs that performed the comparison do not require receiving any further data (since they can deduce the instructions from the comparison) to be instructed to either enter the CA or to slow down at the second position or to stand still at the second position. Therefore, using the first CAVs of the branches to perform the computational acts reduces the data exchanges.

For example, for each i-th branch the first CAV of the i-th branch compares the values and determines if the i-th branch has the highest level of priority among the M branches.

According to an aspect of the invention, each i-th value is determined based on a waiting time of the first CAV in the i-th branch.

Therefore, the i-th branch with the first CAV which waited the longest time may be considered as the branch to prioritize for the use of the CA.

By waiting time it is understood any measure of a time spent by a vehicle in the crossing intersection before entering the CA, that is, a time spent by the vehicle in the corresponding branch. For example, the waiting time of a vehicle may be:

time spent in the branch since the vehicle entered the branch;

time spent in the branch since the vehicle entered the branch proportionally to the length of the branch;

time spent since the first stop of the vehicle in the branch;

cumulative time spent at rest for that vehicle;

time spent since the vehicle passed a reference line in the branch, the reference line being at the same position in each of the branch;

etc.

These waiting times may be comprised in the data related to the vehicles of the branch. The i-th value may be determined only based on the waiting time of the first CAV in the i-th branch.

Determining the values based respectively on the waiting times of each of the first CAVs enables to reduce the complexity of the computation.

In addition, the waiting time may be defined as the time spent or cumulative time spent (described above) weighted by a coefficient. Therefore, it is possible to give a lower or higher priority to a branch by applying respectively a coefficient smaller than one or greater than one. According to an aspect of the invention, the data related to vehicles in the i-th branch comprises data related to vehicles in the i-th branch at a distance equal or shorter than D from the CA and wherein the i-th value is determined based on waiting times of the vehicles in the i-th branch at a distance equal or shorter than D from the CA.

Therefore, the value may be determined based on the waiting time of the first CAV in the branch and according to the waiting times of the vehicles behind the first CAV. More specifically, the value may be determined based on the waiting times of the vehicles between a distance D from the CA (that is, from the stopping line) and the CA (that is, the stopping line). Therefore, the branch with more vehicles will tend to be prioritized. This enables to reduce the cumulative waiting time of all the vehicles at the crossing intersection since several vehicles can enter the CA following the first CAV when it enters the CA.

A determination based on waiting times of the vehicles in a branch may be a determination based on the cumulative waiting times of these vehicles or based on the average of the waiting times, etc.

According to an aspect of the invention, the data related to vehicles in the i-th branch comprises data related to vehicles in the i-th branch at a distance equal or shorter than D from the CA (for example, to all vehicles in the i-th branch at a distance equal or shorter than D from the CA) and wherein the i-th value is determined based on a virtual number of waiting vehicles, said virtual number of waiting vehicles being determined based on an average, on the first k waiting vehicles in the i-th branch, of differences in the waiting time between two consecutive vehicles, k being the maximum vehicle that can wait in the i-th branch at a distance equal or shorter than D from the CA.

Therefore, based on the evolution of the waiting times of the vehicles in the i-th branch (that is the vehicles between a distance D from the stopping line and the stopping line) an estimation of the number of vehicles waiting in line behind the first CAV of the i-th branch is obtained, therefore, taking into account possible vehicles at distances greater than D from the stopping line (thus not considered as being in the branch). This enables to reduce the cumulative waiting time of all the vehicles at the crossing intersection. This is especially relevant when the branches are short (for example, when a branch links two close crossing intersections or when the maximum communication distance between two CAVs is short).

A second aspect of the invention concerns a computer program product comprising code instructions stored on a computer-readable medium to perform the method as described previously when said instructions are run by a processor.

A third aspect of the invention concerns a connected and automated vehicles, CAV, comprising:

a communication unit, a processor, and a non-transitory computer-readable medium comprising instructions stored thereon, which when executed by the processor, configure the CAV to:

when the CAV is at an i-th branch of a road intersection, said road intersection comprising N branches, said i-th branch being one of M branches among the N branches:

receive data related to other vehicles in the i-th branch;

determine an i-th value relative to a level of priority of the i-th branch based on data related to said CAV, and said data related to the other vehicles in the i-th branch;

comparing i-th values relative to level of priorities of respectively said M branches among the N branches, M equal or greater than 2 and smaller or equal to N;

according to the result of the comparison, instructing a first CAV in one p-th branch to enter a crossing area, CA, of the road intersection in a entering time.

DESCRIPTION OF EMBODIMENTS

Figure 1:
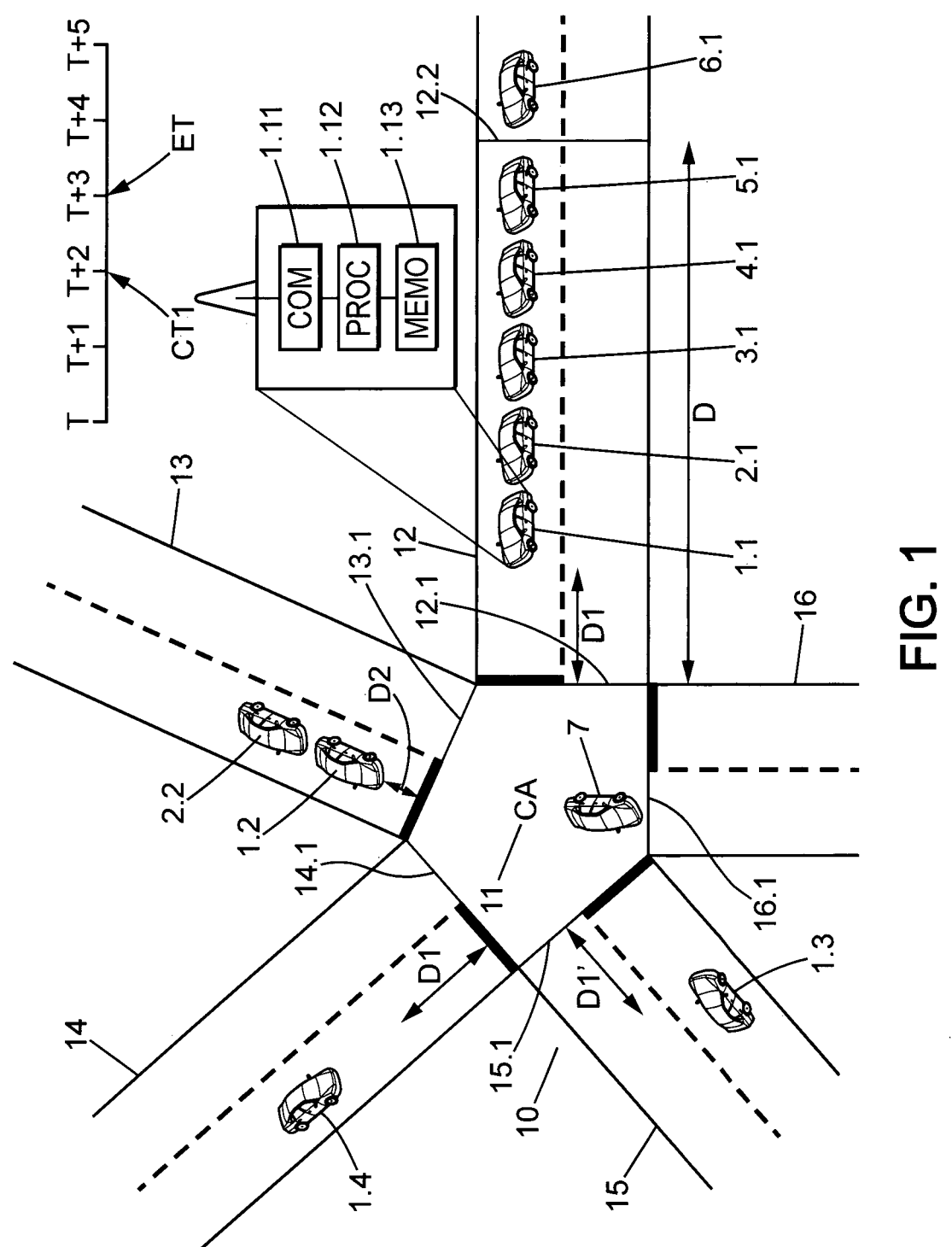
FIG. 1 illustrates CAVs at a crossing intersection at T+2 according to the invention.

The present invention is illustrated by way of example, and not by way of limitation, in the figures of the accompanying drawings, in which like reference numerals refer to similar elements.

Referring to FIG. 1, there is shown a crossing intersection 10 comprising a crossing area 11 and five branches 12 to 16. The entry to the crossing area 11 is marked by a stopping line. These stopping lines are positioned on the right side of the road on the lines 12.1 to 16.1, these lines 12.1 to 16.1 will also be named stopping line in the following. The branches 12 to 16 are the areas of the roads starting respectively from the stopping lines 12.1 to 16.1 and extending to a distance D from these stopping lines 12.1 to 16.1. For example, the branch 12 extends from the stopping line 12.1 to the line 12.2, which is at a distance D from the stopping line 12.1. The crossing area 11 is the area delimited by the stopping lines 12.1 to 16.1, it is the area through which vehicles pass through to go from a branch to another.

FIG. 1 corresponds to the state of the CAVs at the crossing intersection 10 at the beginning, T+2, of a time unit which ends at T+3 by the entering time ET.

The vehicles 1.1 to 5.1 are vehicles in the branch 12 and are heading towards the crossing area 11 at a specific speed $V_{12}$. The vehicles 1.1 to 5.1 are packed together (two consecutive vehicles are at a particular distance, for example, the distance between two consecutive vehicles is a minimum distance required for emergency braking). The first vehicle 1.1 of the branch 12 is at a distance D1 from the stopping line 12.1. If the first vehicle 1.1 maintains its speed it will cover (that is move forward) the distance D1 in one time unit.

The vehicles 1.2 to 2.2 are vehicles in the branch 13 and are stationary. The vehicles 1.2 to 2.2 are also packed together, since they are stationary the distance between these two vehicles may be reduced compared to the minimum distance between two consecutive vehicles in the branch 12. The first vehicle 1.2 of the branch 13 is at a distance D2 from the stopping line 13.1. If the first vehicle 1.2 accelerates to the speed $V_T$ (target speed) it will move forward the distance D2 in one time unit.

The vehicle 1.3 is in the branch 15 and is heading towards the crossing area 11 at a specific speed $V_{15}$. This first and only vehicle 1.3 of the branch 15 is at a distance D1' from the stopping line 15.1. If this first vehicle 1.3 maintains its speed it will move forward the distance D1' in one time unit.

Therefore, the first vehicles 1.1, 1.2 and 1.3 can enter the crossing area in one time unit.

The vehicle 1.4 is in the branch 14 and is heading towards the crossing area 11 at a specific speed $V_{14}$. This first and only vehicle 1.4 of the branch 14 is at a greater distance than D1 from the stopping line 14.1.

The branch 16 does not have any vehicles.

The vehicle 7 is in the crossing area 11, heading in the branch 16 at a target speed $V_T$. For the sake of simplicity $V_{12}$, $V_{14}$, $V_{15}$ and $V_T$ are equal and will be referred to in the following as the speed V. Therefore, the distances D1, D1' are also equal and will be referred to in the following as the distance D1.

Only one distance (distance D) is described here to delimit all the branches, however, each branch could have its own length and therefore as many distances as there are branches could be defined.

Vehicle 6.1 is not in the branch 12 and therefore not in the crossing intersection 10. However, the vehicle 6.1 is following the vehicles 1.1 to 5.1 and will enter the branch 12 soon.

The first vehicles 1.1, 1.2, 1.3 and 1.4 in the branches 12, 13, 14, 15 are CAVs. The second other vehicles of the branch may not be CAVs, for example vehicle 3.1 in branch 12 may be a classical vehicle. Information related to this vehicle may be obtained by the CAVs that are near it, for example, via the vehicles 2.1 and 4.1. For the sack of simplicity all the vehicles in FIG. 1 are CAVs, and therefore can communicate to each other and implement instructions (accelerate at speed V, decelerate from speed V and stop, standstill . . . ) received or deduced.

For that, each CAV comprises a communication module, a processing module and a memory unit. For example, CAV 1.1 comprises a communication module (COM) 1.11, a processing module (PROC) 1.12 and a memory unit (MEMO) 1.13.

The communication module 1.11 emits to and receives from the other CAVs radio signals. The distance at which the CAV 1.1, and thus the communication module, can communicate with other CAVs is at minimum of D. This distance may be superior to the distance between the CAV 1.1 and the other first CAVs of the branches 13 to 16 when these CAVs are at a distance D1 from the crossing area. The radio signals received by the communication module 1.11 may comprise the values relative to the level of priority of the other branches 13, 14, 15 and 16, or instructions to be implemented (accelerate at speed V, decelerate from speed V and stop, standstill . . . ). The radio signals may also comprise data related to the other vehicles 2.1 to 5.1 of the branch 12. The radio signals emitted by the communication module 1.11 may comprise instructions to be implemented (accelerate at speed V, decelerate from speed V and stop, standstill . . . ) by the first CAVs 1.2, 1.3 of the other branches 13 to 16. The radio signals emitted may also comprise the value relative to the level of priority of the branch 12.

The memory unit 1.13 comprises a non-volatile unit which retrieves the computer program and a volatile unit which may store parameters of the method for example the distance D, D1, D2 the speed V, the minimum distance between two consecutive vehicles, the data related to the vehicles of the branch 12, the value relative to the level of priority of the branch 12, the values relative to the level of priority of the other branches 13, 14, 15 and 16, the result of the comparison of the values, the instructions received or deduced, etc.

The processing module 1.12 may be configured to determine the value relative to the level of priority of the branch 12, and to compare this value to the values relative to the level of priority of the other branches 13, 14, 15 and 16 to determine the priority of the branch 12 compared to the other branches, to determine instructions based on the result of the comparison and to implement these instructions (accelerate at speed V, decelerate from speed V and stop at distance D2, standstill at distance D2 . . . ).

Figure 2:
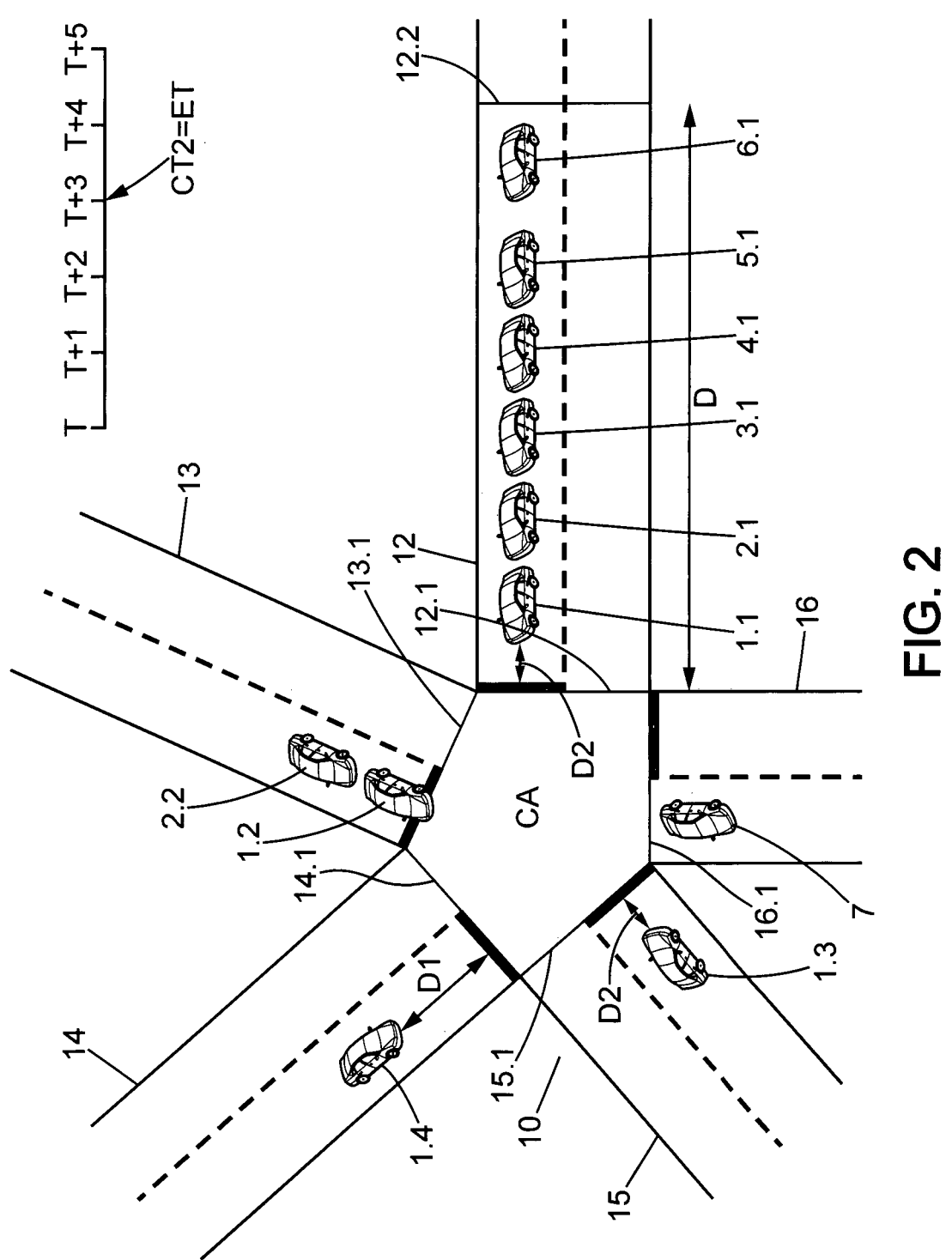
FIG. 2 illustrates CAVs at a crossing intersection at T+3 according to the invention.

FIG. 2 corresponds to the state of the CAVs at the crossing intersection 10 at the end T+3 of the time unit, that is, at the entering time ET.

If the branch 13 is considered as having the highest priority among the other branches:

CAV 1.1 is instructed to decelerate and stop at T+3 (ET) at a distance D2 from the stopping line 12.1;

CAVs 2.1, 3.1, 4.1, 5.1 are instructed to decelerate and stop packed behind CAV 1.1 at T+3 (ET);

CAV 1.3 is instructed to decelerate and stop at T+3 (ET) at a distance D2 from the stopping line 15.1;

CAV 1.2 is instructed to accelerate and enter the crossing area 11 at the entering time ET;

CAV 2.2 is instructed to enter the crossing area 11 behind CAV 1.2;

CAV 1.4 is instructed to move forward to be at a distance D1 from the stopping line 14.1 and at speed $V_1$ at T+3.

In addition, CAVs 1.1 and 1.3 can be instructed to stand still for the next L−1 time units starting from ET, L time units being the time required for CAV 1.2 to cross the crossing area 11, that is, the time required for CAV 1.2 to enter the branch to which it is heading. L may be bigger to take into account the time required for CAV 2.2 to enter the branch to which it is heading.

Figure 3:
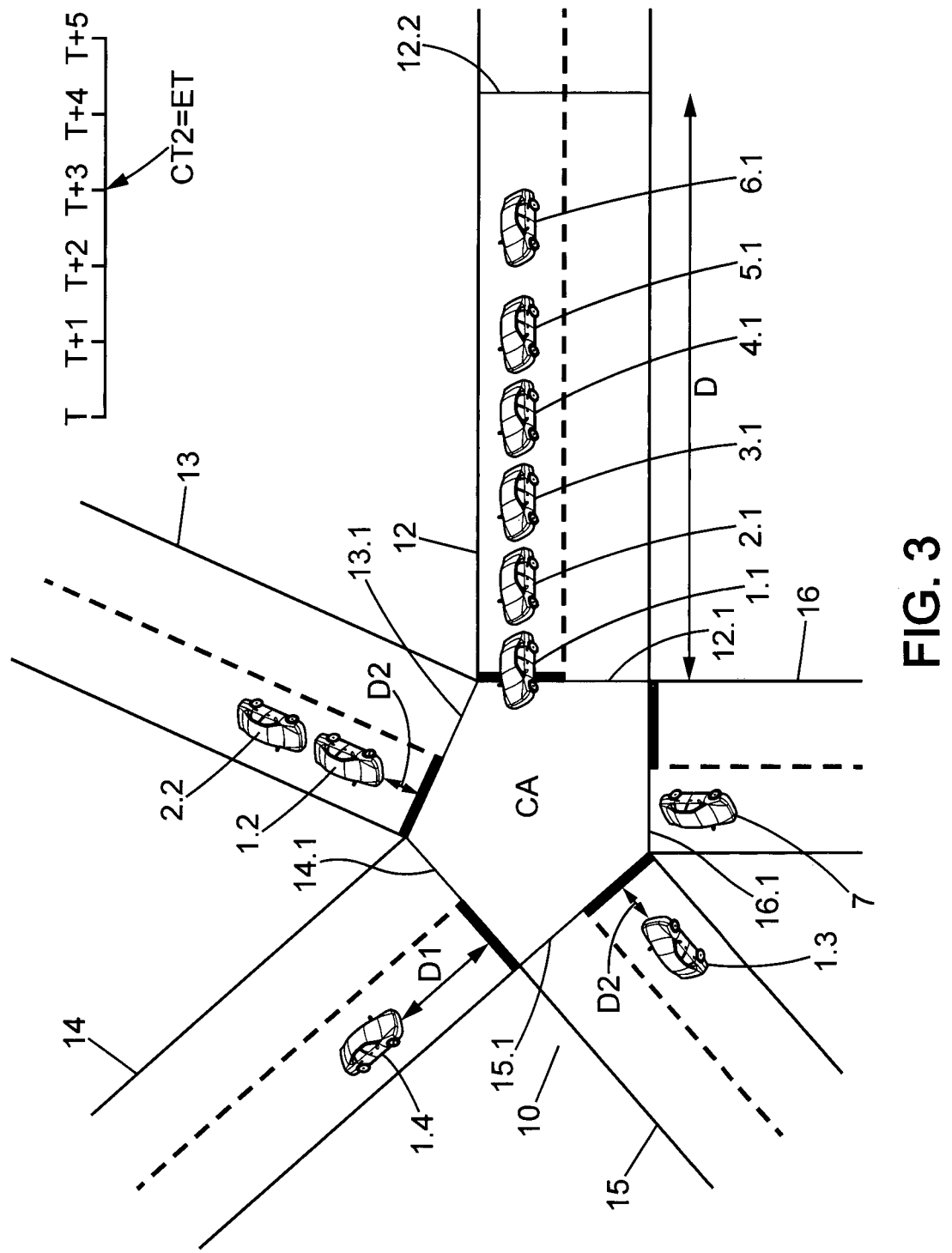
FIG. 3 illustrates CAVs at a crossing intersection at T+3 according to the invention.

FIG. 3 corresponds to the state of the CAVs at the crossing intersection 10 at the end T+3 of the time unit, that is, at the entering time ET.

If the branch 12 is considered as having the highest priority among the other branches:

CAV 1.1 is instructed to maintain it speed $V_T$ and enter the crossing area 11 at the entering time ET;

CAVs 2.1, 3.1, 4.1, 5.1 and eventually CAV 6.1 are instructed to maintain their speed and enter the crossing area 11 behind CAV 1.1 (CAV 6.1 will be instructed to do so once it is in the branch);

CAV 1.3 is instructed to decelerate and stop at T+3 (ET) at a distance D2 from the stopping line 15.1;

CAV 1.2 is instructed to decelerate and stop at T+3 (ET) at a distance D2 from the stopping line 13.1;

CAV 2.2 is instructed to stop at T+3 (ET) behind CAV 1.2;

CAV 1.4 is instructed to move forward to be at a distance D1 from the stopping line 14.1 and at speed $V_T$ at T+3.

This is an illustration, however, it could as well be decided that CAV 1.3 is the one to enter the crossing area 11 at the entering time (T+3, ET). Since CAV 1.4 is not in a position to enter the CA 11 at the entering time ET, CAV 1.4 does not compete with CAV 1.1, 1.2 and 1.3 for using the CA 11.

The instructions regarding CAV 1.4 may be set as parameters. Indeed, when knowing D1 and $V_T$, all first CAVs in a branch may move forward to be at the distance D1 at the speed $V_T$ and at one of the time T+1, T+2, T+3, T+4, T+5, etc. without receiving any specific instructions.

Figure 4:
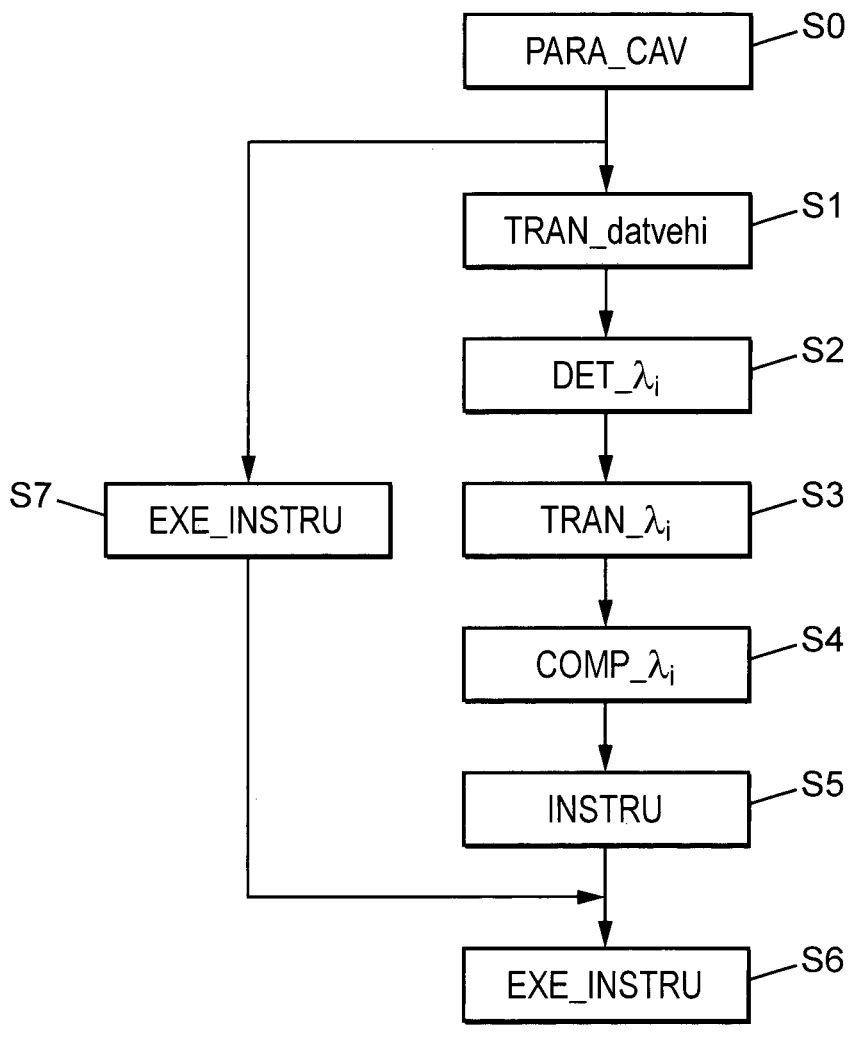
FIG. 4 illustrates a flowchart representing steps according to an embodiment of the invention.

Referring to FIG. 4, there is shown a flowchart of the management of the CAVs at the crossing intersections 10.

At step S0 the CAVs are parametrized, that is, the CAVs receive and store in their memory units the parameters related to the crossing intersections 10. These parameters may be some or all among, the distances D1, D2, D, the target speed, the speeds of the CAVs in each branch $V_{12}$, $V_{13}$, $V_{14}$, $V_{15}$ and $V_{16}$ (which may be equal to the target speed $V_1$), the number of branches, the size of the time units, a time reference point (on which the CAVs can synchronize, for example the entering time), angular degrees between each branch, information relative to the CAVs that are to perform the computing of the values (for example, the first CAV in each branch, or the one with the most computing capacity . . . ), information relative to the rule determining the CAVs that are to perform the comparison of the values (for example, one of the first CAV or all the first CAVs or mutualized through all the first CAVs), information relative to the rule determining the CAVs that are to instruct the CAVs at the crossing intersection, information about the type of data related to vehicles in the branch, information relative to the computing of the values (for example, the formula or algorithm to be used to compute the values), etc.

These parameters may be received through a classical cellular radio network or via V2V communication between the CAVs. For example, CAV 6.1 may receive these parameters from CAV 5.1. These parameters are therefore not necessarily received at the same time by the CAVs in the crossing intersection.

At step S1, according to the information relative to the CAVs that are to perform the computing of the values and the information about the type of data related to vehicles in the branch, each CAV sends this data related to it to the CAV computing the value of its branch. The CAV computing the value of its branch obtains its own data related to it and therefore does not need to send it.

As previously indicated, in this example, the CAV which performs the computing of the value in each branch is the first CAV of that branch.

For example, CAVs 2.1, 3.1, 4.1, 5.1 send the data related to them to CAV 1.1.

For example, each of these CAVs sends at least one among:

it's position in the branch 12;

it's speed;

it's time spent at standstill in the branch 12;

it's time spent in the branch 12, that is, since it passed the line 12.2;

etc.

If a vehicle (for example 3.1) in the branch 12 is not a CAV the data related to it may be determined by the other CAVs near it, for example by the CAV in front of it (in that case CAV 2.1) which computes an estimation of the waiting time of vehicle 3.1 when this vehicle 3.1 crosses the line 12.2.

In a similar manner, CAV 2.2 sends the data related to it to CAV 1.2. CAVs 1.3, 1.4 do not receive any data related to vehicles in their branches 14, 15 since they are the only vehicle in these branches 14, 15.

This step is performed before T+2.

At step S2, the CAVs that obtained the data at step S1, perform the computing of the values $\lambda_i$ relative to the level of priority of the branch i. As previously mentioned in this example, each first CAVs determines the value $\lambda_i$ relative to the level of priority of its branch i.

The determination of the values is made based on waiting times of the vehicles in the branch i.

For example, the value $\lambda_i$ of the branch i may be equal to the waiting time of the first vehicle of branch i, that is $T_{1,i}$. Therefore, for branch 12, $\lambda_{12}$ may be equal to $T_{1,12}$, for branch 13, $\lambda_{13}$ may be equal to $T_{1,13}$, for branch 15, $\lambda_{15}$ may be equal to $T_{1,15}$. In that case, only the waiting time of the first vehicle in each branch is considered, therefore, the data related to vehicles in the branch can be reduced to data related to the first vehicle in the branch.

In another example, the value $\lambda_i$ of the branch i may correspond to the cumulative waiting times of the vehicles of branch i, that is $$\sum\nolimits_{m=1}^{k} T_{m,i},$$

where k is the maximum number of vehicles that can be in the branch i (that is for branch 12 the vehicles that can be packed between the first vehicle 1.1 and the line 12.2 including the first vehicle 1.1), and $T_{m,i}$ is considered null if the vehicle is not in the branch.

Therefore, for branch 12, $\lambda_{12}$ may be equal to $T_{1,12}+T_{2,12}+T_{3,12}+T_{4,12}+T_{5,12}$, for branch 13, $\lambda_{13}$ may be equal to $T_{1,13}+T_{2,13}$, for branch 15, $\lambda_{15}$ may be equal to $T_{1,15}$. In that case, the waiting times of all the vehicles in the branch are considered.

In another example, the value $\lambda_i$ of the branch i may correspond to the same cumulative waiting times of the vehicles of branch i, that is $$\sum\nolimits_{m=1}^{k} T_{m,i}$$

to which is added a virtual cumulative waiting times $CT_v(i)$ of vehicles outside the branch I, that is, $$\lambda_i = \sum\nolimits_{m=1}^{k} T_{m,i} + CT_v(i),$$

with k is the maximum number of vehicles that can be in the branch i (that is for branch 12 the vehicles that can be packed between the first vehicle 1.1 and the line 12.2 including the first vehicle 1.1), $T_{m,i}$ is null if the vehicle is not in the branch, and with $CT_v(i) = m_i \cdot T_{k,i} + \dfrac{m_i(m_i+1)}{2} \cdot \dfrac{T_{1,i} - T_{k,i}}{k-1}$, and with $m_i = \max\left\{ n \in \mathbb{N} \,\middle|\, \left( T_{k,i} - n\left( \dfrac{T_{1,i} - T_{k,i}}{k-1} \right) \right) \geq 0 \right\}$.

Therefore:

$\lambda_{12}$ is equal to $T_{1,12}+T_{2,12}+T_{3,12}+T_{4,12}+T_{5,12}+CT_v(\mathbf{12})$ for branch 12, $\lambda_{13}$ is equal to $T_{1,13}+T_{2,13}$, for branch 13, since $CT_v(\mathbf{13})$ is null, and $\lambda_{15}$ is equal to $T_{1,15}$, for branch 15, since $CT_v(\mathbf{15})$ is null.

In that case, the waiting times of vehicles outside the branches is predicted and considered. The value is the same as in the precedent example except when the branch cannot accept a new vehicle, which is the case in branch 12. In branch 12 it is $CT_v(\mathbf{12})$ which is considered and which is a prediction and not the real waiting time of CAV 6.1.

In step S2 the waiting times of the vehicles in each branch is determined based on the data related to the vehicles in the branch.

As previously indicated, the data related to the vehicles in the branch may be the positions of these vehicles (for example, positions of the vehicles at several moments), the speeds of these vehicles (for example, speeds of the vehicles at several moments), the time spent by each vehicle at standstill in the branch, the time spent by each vehicle in the branch, etc. Based on this data related to the vehicles in the branch, the CAV computing the value relative to a level of priority of its branch may obtain directly or by computation the waiting time $T_{m,i}$ of each vehicle in its branch, that is, it obtains one among:

the time spent in the branch since the vehicle entered the branch;

the time spent in the branch since the vehicle entered the branch proportionally to the length of the branch;

the time spent since the first stop of the vehicle in the branch;

the cumulative time spent at rest for a vehicle;

the time spent since the vehicle passed a reference line in the branch, the reference line being at the same position in each of the branch.

The values $\lambda_i$ relative to the level of priority of branches for which the first CAV 1.4 is not in position to enter the crossing area 11 at the entering time do not need to be computed. This is the case for example with CAV 1.4 which is in branch 14 but at a distance from the stopping line 14.1 greater than D1 at T+2.

At step S3, the values $\lambda_i$ relative to the level of priority computed at step S2 are sent by the CAVs that determined them. In the example where it is the first CAVs that determined these values, these first CAVs (that is the first CAVs of each branch) send these values to the CAV or to a plurality of CAVs that will perform the comparison of these values.

In a first example, CAVs 1.2 and 1.3 respectively send to CAV 1.1 the values $\lambda_{13}$ and $\lambda_{15}$, CAV 1.1 being the CAV which will compare these values along with the value $\lambda_{12}$.

In a second example, each CAV that determined the value sends it to the other first CAVs that are in position to enter the crossing area 11 at the entering time, that is, CAVs 1.2 sends to CAVs 1.1 and 1.3 the value $\lambda_{13}$, CAVs 1.1 sends to CAVs 1.2 and 1.3 the value $\lambda_{12}$ and CAVs 1.3 sends to CAVs 1.1 and 1.2 the value $\lambda_{15}$. In that case, each first CAV competing to enter the crossing area 11 performs the comparison between all the values determined.

Any other solution enabling at least one CAV to receive all the values may be implemented with the invention.

At step S4, the values are compared by the CAVs that received the values $\lambda_i$ relative to the level of priority, for example the CAVs compute $$p = \operatorname*{argmax}_i \lambda_i,$$

p being the index of the branch which is considered as the priority.

In the case of the first example described at step S3, CAV 1.1 determines the greatest value among values $\lambda_{12}$, $\lambda_{13}$ and $\lambda_{15}$.

In the case of the second example described at step S3, each CAVs 1.1, 1.2 and 1.3 determines the greatest value among $\lambda_{12}$, $\lambda_{13}$ and $\lambda_{15}$.

Whatever the case is, in FIG. 2, $\lambda_{13}$ is considered the greatest value and in FIG. 3 $\lambda_{12}$ is considered the greatest value.

At step S5, each CAV at the crossing intersection 10 determines the instructions which have to be executed.

The CAVs which performed the comparison may deduce directly from these comparisons the instructions to be executed depending on their position.

In the first example described at step S3, CAV 1.1 deduces the instructions, which are to enter the CA 11 at CT2 (ET) in FIG. 3 or to slow down and stop at the distance D2 from the stopping line 12.1 in FIG. 2.

In the second example described at step S3, CAVs 1.1, 1.2 and 1.3 deduce the instructions, which are:

for CAV 1.1 to enter the CA 11 at CT2 in FIG. 3 or to slow down and stop at the distance D2 from the stopping line 12.1 in FIG. 2;

for CAV 1.2 to enter the CA 11 at CT2 in FIG. 2 or to stand still at the distance D2 from the stopping line 12.1 in FIG. 3;

for CAV 1.3 to stand still at the distance D2 from the stopping line 12.1 in both FIGS. 2 and 3.

The CAVs that did not perform the comparison may determine the instructions to be executed either by:

receiving direct instructions from another CAV (for example, a CAV may receive these instructions from the first CAV that performed the comparison or from one relaying these instructions);

receiving the index of the branch which is considered as the priority, thus enabling each CAV to determine which first CAV will enter the crossing area 11 and therefore deduce the instructions to be taken;

deducing the instructions based on the behavior of the other CAVs (for example, a CAV may slow down and stop when the CAV in front of it does the same).

CAV 1.4 either receives the instructions from another CAV at the crossing intersection 10 or can be parameterized to execute stored instruction which in both cases instruct CAV 1.4 to move forward to be at a distance D1 from the stopping line 14.1 and at speed $V_T$ at T+3.

At step S6, each CAV executes its instructions. The execution of the instructions starts at T+2 and can extend after T+3. For example, when instructing to stop at the distance D2 at ET, this instruction may further instruct to stand still for a duration of L−1, where L time units corresponds to time required for crossing the CA at $V_1$.

Since the CA 11 will still be used for the crossing of CAV 1.1 and eventually following vehicles 2.1 to 6.1, CAV 1.4 will be instructed to slow down and stop at T+4 at the distance D2.

The invention claimed is:

1. A method for managing traffic of connected and automated vehicles, CAV, at a road intersection comprising N branches, said method comprising:

for each branch i of M branches among the N branches, with i∈[1;M], M equal or greater than 2 and smaller or equal to N:

receiving by a CAV in the i-th branch data related to other vehicles in the i-th branch;

determining by said CAV a i-th value relative to a level of priority of the i-th branch based on data related to said CAV, and said data related to the other vehicles in the i-th branch;

comparing the i-th values;

according to the result of the comparison, instructing a first CAV in one p-th branch among the M branches to enter a crossing area, CA, of the road intersection at an entering time; and controlling a speed of the first CAV to enter the crossing area based on the result of the comparison.

2. The method according to claim 1 wherein the first CAV in the p-th branch is instructed to enter and cross the CA at a target speed.

3. The method according to claim 1, further comprising selecting the M branches among the N branches such as in each i-th branch of the M branches, the first CAV of the i-th branch is at a distance from the CA and at a speed such as in one time unit the first CAV can enter the CA at the entering time.

4. The method according to claim 3 wherein for each i-th branch of the M branches, the first CAV of the i-th branch is either:

at a first position in the i-th branch and at a target speed, or at a second position in the i-th branch and at a speed of 0.

5. The method according to claim 4 further comprising for at least one q-th branch among the M branches other than the p-th branch:

instructing a first CAV in the q-th branch to slow down and stop at the second position within a time unit, if the first CAV in the q-th branch is at the first position, or instructing the first CAVs in the q-th to standstill during at least a time unit at the second position, if the first CAV in the q-th branch is at the second position.

6. The method according to claim 5 wherein instructing the first CAV in the q-th branch to standstill at the second position during at least a time unit is an instruction to standstill at the second position during at least L−1 time units after the entering time, where L time units corresponds to a time duration for crossing the CA at the target speed.

7. The method according to claim 4 further comprising instructing the first CAV in the p-th branch to:

accelerate within one time unit to the target speed to enter the CA at the entering time, if the first CAV in the p-th branch is at the second position; or maintain the target speed to enter the CA at the entering time, if the first CAV in the p-th branch is at the first position.

8. The method according to claim 4 wherein the first position and the second position are determined based on predefined speed curves and/or acceleration curves for accelerating from the second position to enter the CA in one time unit and for slowing down from the first position to stop at the second position in one time unit.

9. The method according to claim 1 further comprising instructing a second CAV in the p-th branch to enter the CA following the first CAV in the p-th branch entering the CA.

10. The method according to claim 1 wherein for at least a i-th branch among the M branches the CAV obtaining the data related to vehicles and determining the level of priority of the i-th branch is the first CAV of the i-th branch.

11. The method according to claim 1 wherein for each i-th branch the first CAV of the i-th branch compares the values and determines if the i-th branch has the highest level of priority among the M branches.

12. The method according to claim 1 wherein each i-th value is determined based on a waiting time of the first CAV in the i-th branch.

13. The method according to claim 1 wherein the data related to vehicles in the i-th branch comprises data related to vehicles in the i-th branch at a distance equal or shorter than D from the CA and wherein the i-th value is determined based on the waiting times of the vehicles in the i-th branch at a distance equal or shorter than D from the CA.

14. The method according to claim 1 wherein the data related to vehicles in the i-th branch comprises data related to vehicles in the i-th branch at a distance equal or shorter than D from the CA and wherein the i-th value is determined based on a virtual number of waiting vehicles, said virtual number of waiting vehicles being determined based on an average, on the first k waiting vehicles in the i-th branch, of differences in the waiting time between two consecutives vehicles, k being the maximum vehicle that can wait in the i-th branch at a distance equal or shorter than D from the CA.

15. The method according to claim 1 wherein the data related to vehicles in the i-th branch is data related to positions and/or speeds and/or waiting times of the vehicles in the i-th branch.

16. A computer program product comprising code instructions stored on a non-transitory computer-readable medium for the execution of the method according to claim 1.

17. A connected and automated vehicle, CAV, comprising:
  a communication unit,
  a processor, and
  a non-transitory computer-readable medium comprising instructions stored thereon, which when executed by the processor, configure the CAV to:
when the CAV is at an i-th branch of a road intersection, said road intersection comprising N branches, said i-th branch being one of M branches among the N branches:
receiving data related to other vehicles in the i-th branch;
determine an i-th value relative to a level of priority of the i-th branch based on data related to said CAV, and said data related to the other vehicles in the i-th branch;
comparing i-th values relative to level of priorities of respectively said M branches among the N branches, M equal or greater than 2 and smaller or equal to N;
according to the result of the comparison, instructing a first CAV in one p-th branch to enter a crossing area, CA, of the road intersection in an entering time; and
controlling a speed of the first CAV to enter the crossing area based on the result of the comparison.

18. The method according to claim 1, wherein the first CAV at the p-th branch enters the CA of the road intersection without stopping before the CA.

19. The method according to claim 1, wherein the comparing is performed before the CAV in the i-th branch arrives at the road intersection.

\* \* \* \* \*